(12) United States Patent
Hsiao et al.

(10) Patent No.: US 9,366,804 B2
(45) Date of Patent: Jun. 14, 2016

(54) BACKPLANE AND BACKLIGHT MODULE AND LIQUID CRYSTAL DISPLAY DEVICE USING SAME

(71) Applicant: Shenzhen China Star Optoelectronics Technology Co., Ltd., Shenzhen, Guangdong (CN)

(72) Inventors: Yuchun Hsiao, Shenzhen (CN); Jiaxin Li, Shenzhen (CN); Gang Yu, Shenzhen (CN); Quan Li, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 311 days.

(21) Appl. No.: 14/356,381

(22) PCT Filed: Mar. 25, 2014

(86) PCT No.: PCT/CN2014/074008
§ 371 (c)(1),
(2) Date: May 5, 2014

(87) PCT Pub. No.: WO2015/135229
PCT Pub. Date: Sep. 17, 2015

(65) Prior Publication Data
US 2016/0109647 A1    Apr. 21, 2016

(30) Foreign Application Priority Data

Mar. 10, 2014  (CN) .......................... 2014 1 0086879

(51) Int. Cl.
*F21V 8/00* (2006.01)
*G02F 1/1333* (2006.01)
(Continued)

(52) U.S. Cl.
CPC ................ *G02B 6/0088* (2013.01); *G02B 6/00* (2013.01); *G02B 6/0091* (2013.01); *G02F 1/133308* (2013.01); *G02F 1/133615* (2013.01);
(Continued)

(58) Field of Classification Search
CPC .......... G02F 1/133308; G02F 1/13452; G02F 1/133615; G02F 2001/133314; G02F 2201/503; G02F 1/133608; G02F 2201/46
See application file for complete search history.

(56) References Cited

U.S. PATENT DOCUMENTS

| | | | |
|---|---|---|---|
| 8,253,882 B2* | 8/2012 | Kikuchi .................. | G09F 9/301 349/58 |
| 2009/0316062 A1* | 12/2009 | Nishizawa ........ | G02F 1/133305 349/58 |
| 2013/0321740 A1* | 12/2013 | An ....................... | H05K 5/0217 349/58 |

(Continued)

*Primary Examiner* — Huyen Ngo
(74) *Attorney, Agent, or Firm* — Andrew C. Cheng

(57) ABSTRACT

The present invention provides a backplane and a backlight module and a liquid crystal display device using the backplane. The backplane includes: a bottom plate (2) and multiple side plates (4) connected to the bottom plate (2). The bottom plate (2) includes a base section (22) and a mounting section (24) connected to a lateral edge of the base section (22). The base section (22) has two ends that are each provided with a stepwise structure (222) for mounting a curved light guide plate to an inner side thereof. The mounting sections (24) has an outside surface that is curved for mounting a circuit board. The base section (22) has an outside surface on which first reinforcement ribs (226) and second reinforcement ribs (228) perpendicularly connected thereto are formed. The backplane and the backlight module and the liquid crystal display device using the backplane of the present invention help make the backplane simple in structure and easy to manufacture and simplifies the assembling operation and reduces the manufacturing cost.

10 Claims, 3 Drawing Sheets

(51) Int. Cl.
  *G02B 6/00* (2006.01)
  *G02F 1/1335* (2006.01)
(52) U.S. Cl.
  CPC ............... *G02F2001/133314* (2013.01); *G02F 2001/133322* (2013.01)

(56) References Cited

U.S. PATENT DOCUMENTS

2014/0125913 A1* 5/2014 Lee .................. G02F 1/133615
  349/58

* cited by examiner

BACKPLANE AND BACKLIGHT MODULE AND LIQUID CRYSTAL DISPLAY DEVICE USING SAME

BACKGROUND OF THE INVENTION

1. Field of the Invention

The present invention relates to the field of liquid crystal displaying, and in particular to a backplane and a backlight module and a liquid crystal display device using the backplane.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The structure of a conventional liquid crystal panel is composed of a color filter (CF) substrate, a thin-film transistor (TFT) array substrate, and a liquid crystal layer arranged between the two substrates and the principle of operation is that a driving voltage is applied to the two glass substrates to control rotation of the liquid crystal molecules of the liquid crystal layer in order to refract out light emitting from the backlight module to generate images. Since the liquid crystal panel itself does not emit light, light must be provided from the backlight module in order to normally display images. Thus, the backlight module is one of the key components of the liquid crystal displays. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal display panel. The side-edge backlight module comprises an LED light bar, serving as a backlight source, which is arranged at an edge of a backplane to be located rearward of one side of the liquid crystal display panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal panel.

Recently, major manufacturers have marketed curved liquid crystal television sets one after another. Generally speaking, the curved liquid crystal television sets allows for the best viewing effect from edge to edge, while a regular liquid crystal television set has generally poor capability of displaying at edges of a screen. The curved liquid crystal television has a screen that has a curved design showing a surrounding configuration toward a viewer so as to provide a wide full-view image, allowing for the same visual enjoyment at both the central portion or the circumferential portion of the screen and also reducing distortion of off-axis viewing for viewing at a short distance. Further, the curved liquid crystal television allows a viewer's viewing distance to be extended, achieving better experience of viewing. Thus, compared to the regular liquid crystal televisions, the curved liquid crystal television has advantages, including: (1) brand differentiating, (2) wider viewable angle, and (3) reducing distortion for short distance viewing.

Heretofore, the curved liquid crystal televisions that are available in the market are made by combining a curved backlight module and a curved liquid crystal panel. Due to the large-sized curved metal plate being hard to manufacture, it is common to provide a curved steel frame first and then mounting the steel frame to a flat backplane to achieve forced bending thereby realizing bending of the backlight module. This increases the cost of the backlight module and also complicates the structure of the backplane.

In view of the above discussed problems, a liquid crystal display device having a stepwise backplane is currently available, in which a stepwise backplane structure is used to obtain a desired curvature of circular arc thereby achieving bending of the backlight module. Referring to FIG. 1, the liquid crystal display device comprises a backlight module 100, a mold frame 300 mounted on the backlight module 100, a liquid crystal display panel 500 arranged on the mold frame 300, and a front bezel 700 arranged on the liquid crystal display panel 500. The backlight module 100 has a backplane 102, which is made to have a structure of a combination of a flat plate and steps. A curved light guide plate 104 is supported inside the backplane 102 to be in compliance with the curvature of the liquid crystal display panel 500. However, such a structure may cause a circuit board (X_Board) 900 not to securely fix to a bottom of the backplane 102 (as shown in FIG. 2). Further, the bottom of the stepwise backplane 102 has different distances to different positions of a TFT (Thin-Film Transistor) upper surface of the liquid crystal display panel 500, so that COF (Chip On Film) of some positions may be too short to be routed to the bottom of the stepwise backplane 102, thereby increasing the difficult of assembling.

SUMMARY OF THE INVENTION

An object of the present invention is to provide a backplane, which adopts a backplane having a stepwise structure to effectively support a light guide plate and comprising a curved mounting section formed on the backplane for mounting a circuit board, so that the structure is simple and easy to manufacture to thereby effectively reduce the manufacturing cost.

Another object of the present invention is to provide a backlight module, which adopts a backplane having a stepwise structure to effectively support a light guide plate and comprising a curved mounting section formed on the backplane for mounting a circuit board, so that the structure is simple and easy to manufacture to thereby effectively reduce the manufacturing cost.

A further object of the present invention is to provide a liquid crystal display device, which adopts a backplane having a stepwise structure to effectively support a light guide plate and comprising a curved mounting section formed on the backplane for mounting a circuit board, so that the structure is simple and easy to manufacture to thereby effectively reduce the manufacturing cost.

To achieve the above objects, the present invention provides a backplane, which comprises: a bottom plate and a plurality of side plates connected to the bottom plate. The bottom plate comprises a base section and a mounting section connected to a lateral edge of the base section. The base section has two ends that are each provided with a stepwise structure to allow for mounting a curved light guide plate to an inner side thereof. The mounting section has an outside surface that is curved for mounting a circuit board.

The base section has an outside surface that comprises a pair of first reinforcement ribs that are parallel to each other and are parallel to the mounting section.

The outside surface of the base section comprises two parallel second reinforcement ribs. The second reinforcement ribs are located in a central portion of the base section and are perpendicularly connected between the two first reinforcement ribs.

The stepwise structure comprises two steps.

The present invention also provides a backlight module, which comprises: a backplane, a light guide plate arranged in the backplane, and a backlight source arranged in the backplane. The backplane comprises a bottom plate and a plurality of side plates connected to the bottom plate. The bottom plate comprises a base section and a mounting section connected to a lateral edge of the base section. The base section has two ends that are each provided with a stepwise structure to allow for mounting a curved light guide plate to an inner side thereof. The mounting section has an outside surface that is curved for mounting a circuit board.

The light guide plate is arranged in a curved form having two ends respectively mounted to and supported on the stepwise structure. The light guide plate has at least one light incidence surface. The backlight source is mounted to the side plates to correspond to the light incidence surface.

The base section has an outside surface that comprises a pair of first reinforcement ribs that are parallel to each other and are parallel to the mounting section.

The outside surface of the base section comprises two parallel second reinforcement ribs. The second reinforcement ribs are located in a central portion of the base section and are perpendicularly connected between the two first reinforcement ribs.

The stepwise structure comprises two steps.

The present invention further provides a liquid crystal display device, which comprises: a backlight module, a mold frame mounted on the backlight module, a liquid crystal display panel arranged on the mold frame, a front bezel arranged on the liquid crystal display panel, and a circuit board mounted on the backlight module and electrically connected to the liquid crystal display panel. The backlight module comprises a backplane, a light guide plate arranged in the backplane, and a backlight source arranged in the backplane. The backplane comprises a bottom plate and a plurality of side plates connected to the bottom plate. The bottom plate comprises a base section and a mounting section connected to a lateral edge of the base section. The base section has two ends that are each provided with a stepwise structure to allow for mounting a curved light guide plate to an inner side thereof. The mounting section has an outside surface that is curved for mounting a circuit board.

The light guide plate is arranged in a curved form having two ends respectively mounted to and supported on the stepwise structure. The light guide plate has at least one light incidence surface. The backlight source is mounted to the side plates to correspond to the light incidence surface.

The base section has an outside surface that comprises a pair of first reinforcement ribs that are parallel to each other and are parallel to the mounting section.

The outside surface of the base section comprises two parallel second reinforcement ribs. The second reinforcement ribs are located in a central portion of the base section and re perpendicularly connected between the two first reinforcement ribs.

The stepwise structure comprises two steps.

The efficacy of the present invention is that the present invention provides a backplane and a backlight module and a liquid crystal display device using the backplane, in which the backplane has a bottom plate on which a curved mounting section is formed to help mount a circuit board and has a simple structure and is easy to make thereby simplifying the assembling operation and reducing the manufacturing cost. The backplane is provided with stepwise structures to effectively support a light guide plate and to achieve curvature mating with a liquid crystal display panel to thereby enhance the quality of the backlight module. Further, the backplane has an outside surface on which reinforcement ribs are provided to effectively increase the strength of the backplane.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
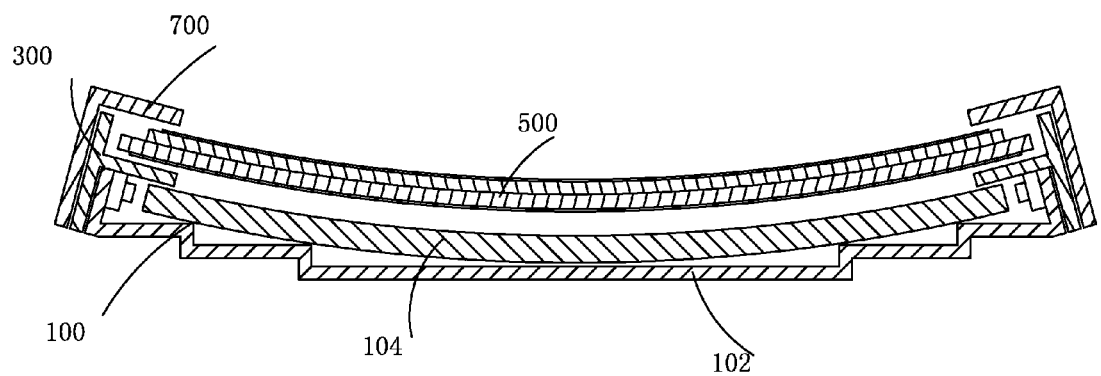
FIG. 1 is a cross-sectional view showing a conventional liquid crystal display device.
Figure 2:
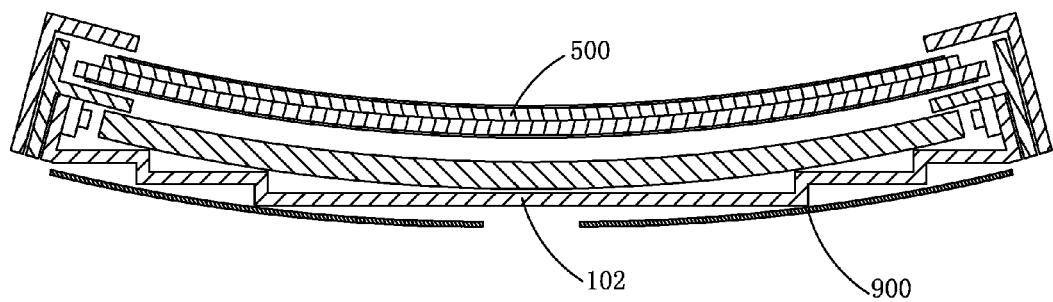
FIG. 2 is a cross-sectional view showing a combined arrangement of a backlight module and a circuit board of the conventional liquid crystal display device.
Figure 3:
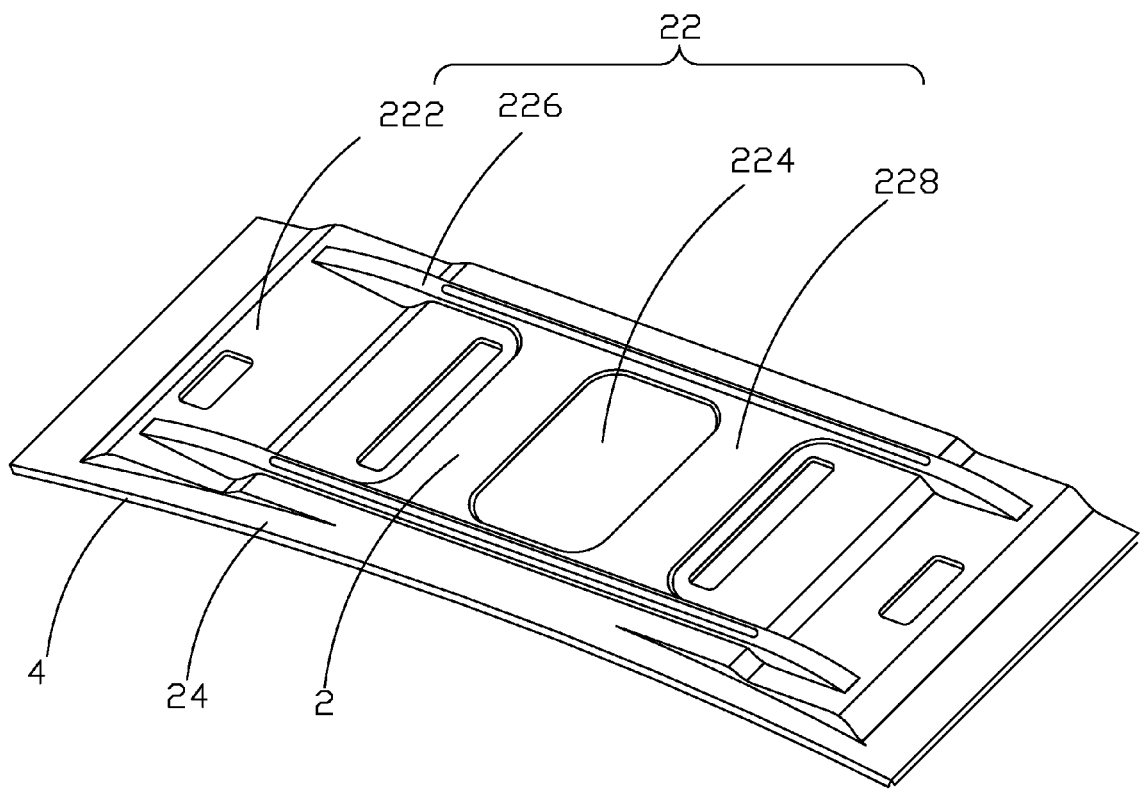
FIG. 3 is a perspective view showing a backplane according to the present invention.
Figure 4:
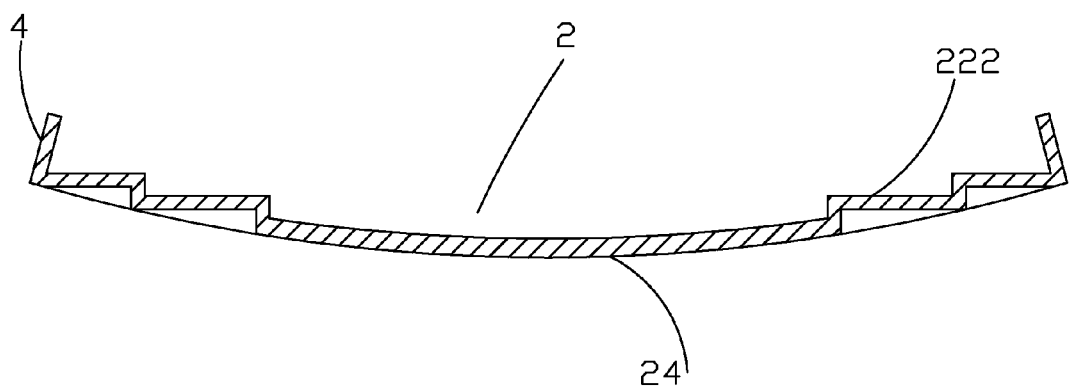
FIG. 4 is a cross-sectional view showing the backplane of the present invention.

Referring to FIGS. 3 and 4, the present invention provides a backplane, which comprises: a bottom plate 2 and a plurality of side plates 4 connected to the bottom plate 2. The bottom plate 2 comprises a base section 22 and a mounting section 24 connected to a lateral edge of the base section 22. The base section 22 has two ends that are each provided with a stepwise structure 222. The stepwise structures are arranged to collectively fit a curvature of a circular arc in order to enable mounting of a curved light guide plate 40 (see FIG. 5) to an inner side thereof. The mounting section 24 has an outside surface that is curved for mounting a circuit board 240 (see FIG. 6).

The base section 22 has an outside surface 224 that comprises a pair of first reinforcement ribs 226 that are parallel to each other and are parallel to the mounting section 24. The outside surface of the base section 22 also comprises two parallel second reinforcement ribs 228. The second reinforcement ribs 228 are located in a central portion of the base section 22 and are perpendicularly connected between the two first reinforcement ribs 226. The combination of the first reinforcement ribs 226 and the second reinforcement ribs 228 helps increase the strength of the backplane.

Specifically, the stepwise structure 222 comprises two steps and accordingly, the side plate 4 and the base section 22 collectively define three steps.

The backplane can be made through stamping and has a simple structure so as not to require bending of a large-sized plate and also avoid a steel frame that is used in the prior art thereby reducing the manufacturing cost. Further, the curved mounting section 24 facilitates mounting of the circuit board 240 and positioning of COF.

Figure 5:
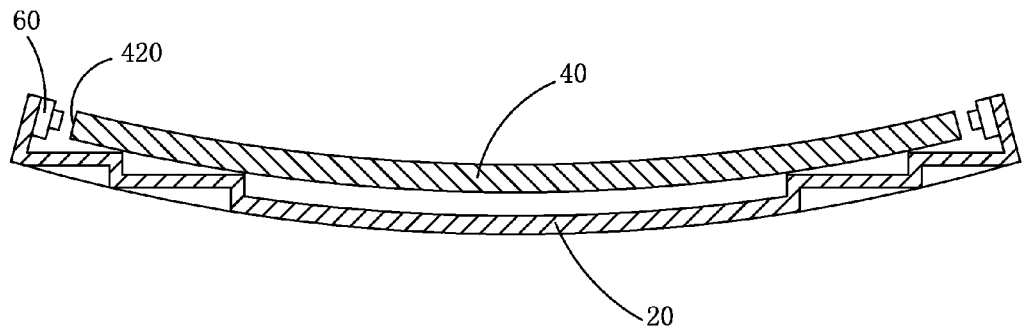
FIG. 5 is a cross-sectional view showing a backlight module according to the present invention.

Referring to FIG. 5, the present invention further provides a backlight module, which comprises: a backplane 20, a light guide plate 40 arranged in the backplane 20, and a backlight source 60 arranged in the backplane 20.

Referring to FIGS. 3 and 4, the backplane 20 comprises a bottom plate 2 and a plurality of side plates 4 connected to the bottom plate 2. The bottom plate 2 comprises a base section 22 and a mounting section 24 connected to a lateral edge of the base section 22. The base section 22 has two ends that are each provided with a stepwise structure 222. The stepwise structures are arranged to collectively fit a curvature of a circular arc in order to enable mounting of a curved light guide plate to an inner side thereof. The mounting section 24 has an outside surface that is curved for mounting a circuit board 240 (see FIG. 6).

The base section 22 has an outside surface 224 that comprises a pair of first reinforcement ribs 226 that are parallel to each other and are parallel to the mounting section 24. The outside surface of the base section 22 also comprises two parallel second reinforcement ribs 228. The second reinforcement ribs 228 are located in a central portion of the base section 22 and are perpendicularly connected between the two first reinforcement ribs 226. The combination of the first reinforcement ribs 226 and the second reinforcement ribs 228 helps increase the strength of the backplane for better supporting optical elements, such as a light guide plate.

Specifically, the stepwise structure 222 comprises two steps and accordingly, the side plate 4 and the base section 22 collectively define three steps.

It is noted that the light guide plate 40 is arranged in a curved form having two ends respectively mounted to and supported on the stepwise structures 222. The light guide plate 40 has at least one light incidence surface 420. The backlight source 60 is mounted to the side plates 4 to correspond to the light incidence surface 420 so that the backlight source 60 emits light that enters the light guide plate 40 and is converted by the light guide plate 40 into a surface light source.

Figure 6:
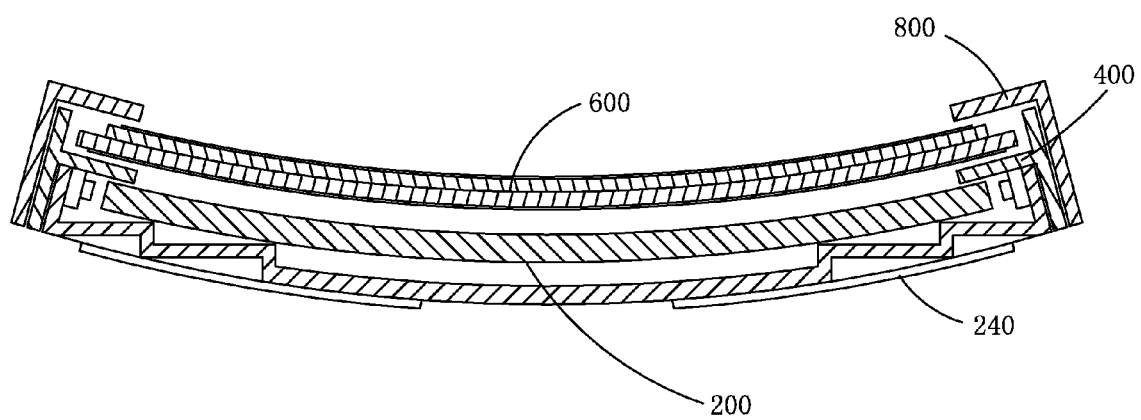
FIG. 6 is a cross-sectional view showing a liquid crystal display device according to the present invention.

Referring to FIG. 6, the present invention further provides a liquid crystal display device, which comprises: a backlight module 200, a mold frame 400 mounted on the backlight module 200, a liquid crystal display panel 600 arranged on the mold frame 400, a front bezel 800 arranged on the liquid crystal display panel 600, and a circuit board 240 mounted on the backlight module 200 and electrically connected to the liquid crystal display panel 600.

The detailed description of the backlight module made previously with reference to FIGS. 3-5 is also applicable to the backlight module 200 here so that repeated description will be omitted.

In summary, the present invention provides a backplane and a backlight module and a liquid crystal display device using the backplane, in which the backplane has a bottom plate on which a curved mounting section is formed to help mount a circuit board. The backplane is provided with stepwise structures to effectively support a light guide plate and to achieve curvature mating with a liquid crystal display panel to thereby enhance the quality of the backlight module. Further, the backplane has an outside surface on which reinforcement ribs are provided to effectively increase the strength of the backplane for better supporting optical elements, such as a light guide plate. Thus, the backplane has a simple structure and is easy to make thereby simplifying the assembling operation and reducing the manufacturing cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backplane, comprising: a bottom plate and a plurality of side plates connected to the bottom plate, the bottom plate comprising a base section and a mounting section connected to a lateral edge of the base section, the base section having two ends that are each provided with a stepwise structure to allow for mounting a curved light guide plate to an inner side thereof, the mounting section having an outside surface that is curved for mounting a circuit board.

2. The backplane as claimed in claim 1, wherein the base section has an outside surface that comprises a pair of first reinforcement ribs that are parallel to each other and are parallel to the mounting section.

3. The backplane as claimed in claim 2, wherein the outside surface of the base section comprises two parallel second reinforcement ribs, the second reinforcement ribs being located in a central portion of the base section and being perpendicularly connected between the two first reinforcement ribs.

4. The backplane as claimed in claim 1, wherein the stepwise structure comprises two steps.

5. A backlight module, comprising: a backplane, a light guide plate arranged in the backplane, and a backlight source arranged in the backplane, the backplane comprising a bottom plate and a plurality of side plates connected to the bottom plate, the bottom plate comprising a base section and a mounting section connected to a lateral edge of the base section, the base section having two ends that are each provided with a stepwise structure to allow for mounting a curved light guide plate to an inner side thereof, the mounting section having an outside surface that is curved for mounting a circuit board.

6. The backlight module as claimed in claim 5, wherein the light guide plate is arranged in a curved form having two ends respectively mounted to and supported on the stepwise structure, the light guide plate having at least one light incidence surface, the backlight source being mounted to the side plates to correspond to the light incidence surface.

7. The backlight module as claimed in claim 5, wherein the base section has an outside surface that comprises a pair of first reinforcement ribs that are parallel to each other and are parallel to the mounting section; the outside surface of the base section comprises two parallel second reinforcement ribs, the second reinforcement ribs being located in a central portion of the base section and being perpendicularly connected between the two first reinforcement ribs; and the stepwise structure comprises two steps.

8. A liquid crystal display device, comprising: a backlight module, a mold frame mounted on the backlight module, a liquid crystal display panel arranged on the mold frame, a front bezel arranged on the liquid crystal display panel, and a circuit board mounted on the backlight module and electrically connected to the liquid crystal display panel, the backlight module comprising a backplane, a light guide plate arranged in the backplane, and a backlight source arranged in the backplane, the backplane comprising a bottom plate and a plurality of side plates connected to the bottom plate, the bottom plate comprising a base section and a mounting section connected to a lateral edge of the base section, the base section having two ends that are each provided with a stepwise structure to allow for mounting a curved light guide plate to an inner side thereof, the mounting section having an outside surface that is curved for mounting a circuit board.

9. The liquid crystal display device as claimed in claim 8, wherein the light guide plate is arranged in a curved form having two ends respectively mounted to and supported on the stepwise structure, the light guide plate having at least one light incidence surface, the backlight source being mounted to the side plates to correspond to the light incidence surface.

10. The liquid crystal display device as claimed in claim 8, wherein the base section has an outside surface that comprises a pair of first reinforcement ribs that are parallel to each other and are parallel to the mounting section; the outside surface of the base section comprises two parallel second reinforcement ribs, the second reinforcement ribs being located in a central portion of the base section and being perpendicularly connected between the two first reinforcement ribs; and the stepwise structure comprises two steps.

* * * * *